Patented Oct. 30, 1928.

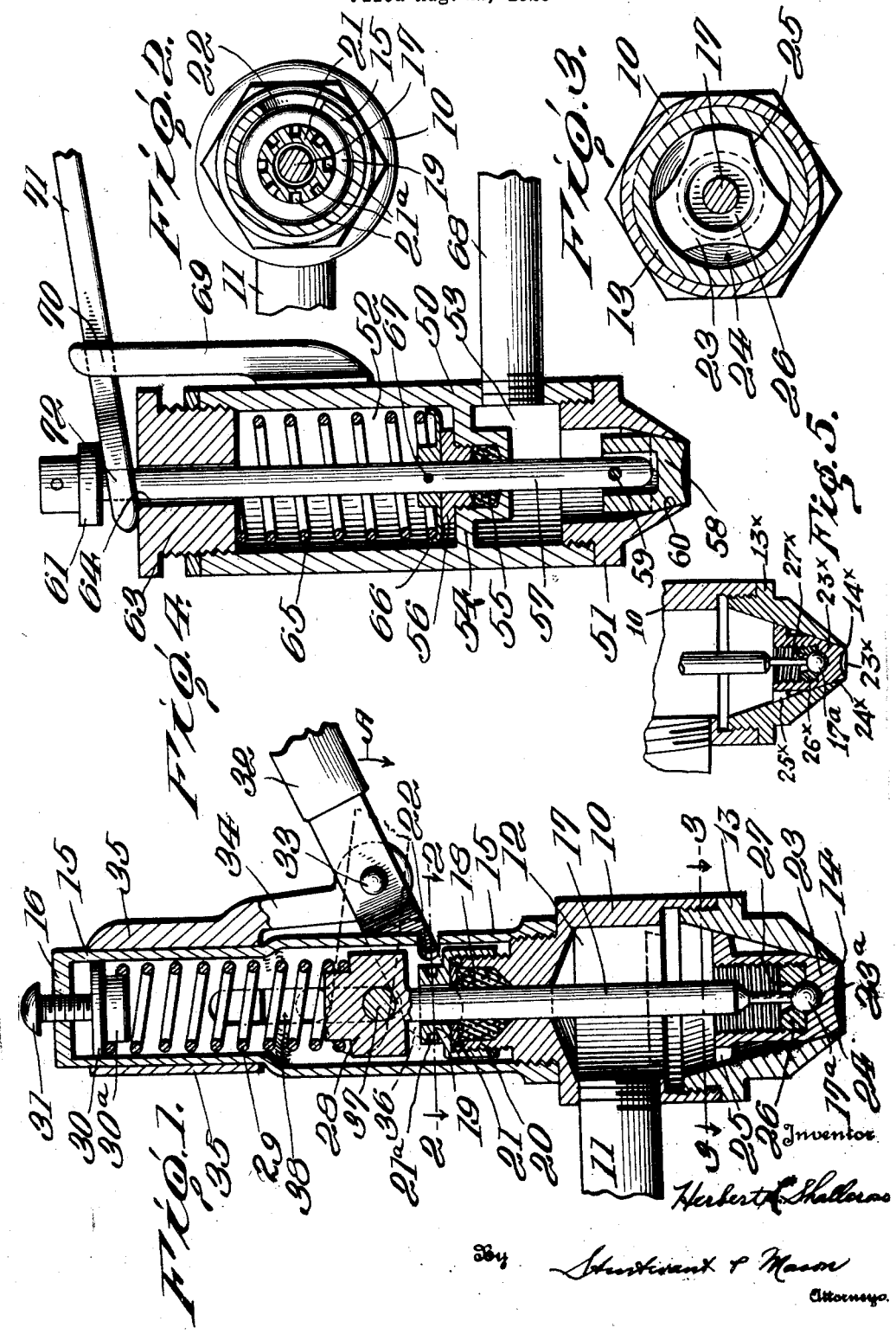

1,689,974

UNITED STATES PATENT OFFICE.

HERBERT L. SHALLCROSS, OF PHILADELPHIA, PENNSYLVANIA.

VALVE.

Application filed August 22, 1925. Serial No. 51,867.

This invention relates to improvements in valves, and more particularly to quick-shut-off valves for controlling liquids where it is desirable that no after-drip occur.

One of the objects of this invention is the provision of a valve in which the closure element is quickly and accurately returned to seating engagement, upon release.

A further object is to provide a valve of this type which delivers a directed, substantially solid stream.

Another object is to provide a valve in which the closure element is guided positively to its seating position.

A further object is to provide such a valve with a closure element and seat assembly in which any liquid left upon either is held against dripping until the next operation of the closure element.

Still another object of this invention is to provide means for varying the spring seating pressure of the closure element to correspond with the nature of the liquid being controlled.

A further object is to provide such valves of a structure adapted to have removable handles employed therewith, so that an unauthorized person cannot cause the actuation of the valve and the discharge of the liquid at an improper time.

With these and other objects in view, as will appear in the course of the following specification and claims, two forms of execution of such valves are shown on the accompanying drawing, in which:

Fig. 1 is a longitudinal section through a valve.

Figs. 2 and 3 are sections on lines 2—2 and 3—3 respectively of Fig. 1.

Fig. 4 is a similar section through a modified form of the valve.

Fig. 5 is a section corresponding to Fig. 1 through a discharge nozzle and closure element of a different size, which is adapted to be substituted for the corresponding members of Fig. 1, this section being on a somewhat smaller scale than that of Fig. 1.

According to Fig. 1, the valve is constructed with a casing 10 having the delivery conduit 11 leading thereto for the admission of liquid to the chamber 12 in the casing. At the lower end, the casing is threaded for the reception of the discharge nozzle 13 which has conical inner and outer surfaces substantially meeting at the lower end of the nozzle in a line at 14. The upper end of the casing is likewise threaded for the reception of the upstanding tube 15 which is closed at its uppermost end 16.

A valve stem 17 passes through the upper wall of the casing 10, being packed by a suitable packing 18 therein, clamped and adjusted by the gland nut 19 which is likewise threaded upon the casing at 20, and has the portion 21 integral therewith which has cavities 21ª therein, shown as eight in number. A nail or spanner wrench may be inserted through the peripheral slot 22 in the tube 15 which extends in the illustration about 60 degrees around the circumference, into one of these cavities 21ª, to adjust the packing while the valve is in service.

The valve stem at its lower end carries the closure element 23 of the valve, which at its lower end 24 is made conical to adapt it to the shape of the interior of the nozzle 13. A cavity 23ª which is of spherical form is provided in the outer end of the element 23. Near its upper end, this closure element 23 has a series of radially extending lugs 25 which, during the closing of the valve, guide the element 23 into the proper and alined position in the nozzle 13. The lower end 17ª of the valve stem 17 is of spherical shape, and is held in the closure element 23 by the threaded bushing 26, which is appropriately swaged in place and provided with a conical recess at 27 to permit the free oscillation of the closure element 23 with regard to the valve stem 17.

At the upper end, the valve stem 17 has an enlargement 28 which serves as a counter-support for a coil spring 29, which at its outer end bears against a disk 30 and surrounds the alining lug 30ª integral therewith. A setscrew 31 passes through the closed end 16 of the tube 15, and enables the adjustment of the compression of the coil spring 29.

The valve handle 32 is carried by the pivot 33 on the ear 34 of the sleeve 35. This sleeve 35 fits closely but removably upon the reduced upper end of the tube 15, and presents a fulcrum for the movement of the handle in the direction of the arrow A in Fig. 1, into the opened position shown in dotted lines. The engaging end of the handle has bifurcations 36, one of which is shown in the section, which embrace the tube 15, and fit beneath the pin 37 which passes through the enlarged portion 28 of the valve stem 17. This pin 37 passes through the slots 38 formed in the tube 15.

In operation, when the handle 32 is depressed, the bifurcated ends 36 raise the valve stem 17 against the compresion of the coil spring 29, and move the closure element 23 upward into the position shown in dotted lines in Fig. 1. The liquid in the central chamber 12 of the casing 10 then has free egress to the exterior around the conical portion 24 of the closure element. When the desired quantity of liquid has been delivered, the handle 32 is released, and the coil spring 29 causes the immediate downward movement of the valve stem 17 and therewith of the closure element; the latter returns to the full line position, and any liquid trapped between the closing surface 24 and the lugs 25 is forced upward between the lugs and back into the central chamber 12.

The liquid passes from the inlet conduit 11 to the casing chamber 12, and issues through the annular passage between nozzle 13 and the closing element 23 in a directed stream which flows directly downward, and is substantially solid during the course of the flow.

Any liquid which adheres by surface tension to the thin lip 14 of the nozzle or to the edge of the closure element 23 is drawn by this same surface tension into the cupped recess 23ᵃ of the closure element, where it remains until a further quantity of liquid is withdrawn.

It has been found in practice that both viscous liquids such as paints and inks and fluids such as water may be readily and expeditiously handled by this valve without the slightest drip after seating of the valve. In this way, unskilled operators may rapidly and cleanly fill containers, without soiling the exteriors.

When it is desired to discontinue the delivery of liquids through the valve, the sleeve 35 and the handle associated therewith may be removed, after which it is difficult or impossible for an unauthorized person to operate the valve by intent or inadvertence, and cause soiling of the surroundings. If desired, a strap may be passed around the valve and engaged in the slots 38 and 22 of the same, and secured by a lock; this absolutely prevents delivery through the valve.

By this construction, the nozzles may be interchanged, as well as the closure elements, so that the size of the annular passage around the closure element in the open position, will be adapted to the characteristic of the particular liquid being handled; and the spring tension may be adjusted at will.

Such an interchangeable nozzle and closure element, to be substituted for the similar elements of Fig. 1, is shown in Fig. 5 of the drawing, in which the same reference numerals with the superscript "x" have been employed to indicate similar parts; while the same reference numeral is employed to indicate an identical part with respect to Fig. 1. It will be noted that in Fig. 5 the diameter of the orifice delimited by the circular line 14ˣ at the bottom is smaller than the corresponding orifice defined by the circular line 14 in Fig. 1. Similarly, the closure element 23ˣ is of smaller size in order to fit the smaller orifice 14ˣ; in comparison with the closure element 23 to fit the larger orifice 14 in Fig. 1.

By such interchangeable nozzles, it is possible to retain the same valve body 10 in its permanent association with the feed pipe 11; and also the head members of the device. By this means, the size of the orifice, as well as the drop-receiving depression at the bottom, may be selected by the operator according to the conditions of operation such as the viscosity of the fluid, the quantity to be delivered, etc. In the particular example represented in Fig. 5, the same common valve body 10 of Fig. 1 receives a discharge nozzle 13ˣ having a greater interior angle, and hence giving a smaller orifice 14ˣ. The closure element 23ˣ has a similar taper to that of the valve body 13ˣ and likewise a smaller closure end 23ᵃˣ. It is thus obvious that orifices of different sizes with corresponding closure ends may be provided, the discharge nozzles and closure elements being constructed in sets, and each provided with means including a screw thread fitting the screw thread of the common valve body 10 and the common valve stem 17.

In the modified form shown in Fig. 4, the casing 50 has a nozzle 51 threaded thereto. The casing itself is divided interiorly into two chambers 52 and 53, with the partition 54 between them, which carries the packing material 55 and the adjusting nut 56, which is accessible through the upper end of the chamber 52. The valve stem 57 passes through this packing, and carries at its lower end by a loose pin 59, a closure element 58, which has the conical surface 60 to engage the conical interior of the nozzle 51. At the upper end of the stem is pinned a collar 61. The upper end of the chamber 52 is closed by a threaded bushing 63 having an aperture 64 therein for the reception of the valve stem 57. A coil spring 65 is contained within this chamber 52 and bears upon the bushing 63 and the supporting disk 66 which is pinned to the valve stem 57 by a pin 67 to move therewith.

A conduit 68 delivers liquid to the chamber 53 of the valve.

An ear 69 is fastened to the casing 50, and has a bifurcated upper end 70 to receive the handle 71, which itself is bifurcated at the operating end 72 to embrace the valve stem 57, and press upward against the collar 61.

The operation of this form of the valve is substantially the same as that already described. The handle 71 may be removed for security, as before; and the valve locked.

In these forms, the valve may be readily and quickly cleaned, without changing the tension upon the return springs, by unscrewing the nozzles, and slipping a tool around and into the closure element in Fig. 1 to release the connection between valve stem and element; and in Fig. 2 by driving out the pin 59. The spring pressure may be adjusted while the valve is in operative condition, from the exterior; and any leakage around the valve stem may be shut off by the packed gland without dismounting.

Obvious changes may be made in the execution of the device within the scope of the appended claims.

I claim:

1. In a valve, a casing forming a liquid chamber which terminates at the bottom in a conical passage with an externally conical wall intersecting the conical passage wall in a plane, a closure element having a conical lower end to enter and seal said conical passage and in its sealed position to present its lower end substantially in said plane of intersection and having a recess in its lower end to hold the final delivery of liquid from said passage, and means to move said element into and out of sealing relation with said passage.

2. In a valve, a casing, interchangeable conical nozzles adapted to be attached to the bottom of said casing, interchangeable closing elements each adapted to seal one of said nozzles, a valve stem, means to move said stem in the direction of its axis, means on said stem to carry each of said elements in self-alining relation to its respective nozzle in assembled condition, and means on each of said elements to aline it within its respective nozzle.

3. In a dispensing faucet, a depending tubular casing having a circular discharge port at its lower end, the walls of which terminate at a uniform level, a valve downwardly movable to seat in said casing to close said port and having a head at its lower end adapted and arranged to fit said port and to terminate at the level of the lower end of the casing when the valve is seated, said head having a circular concave recess opening to its lower end throughout the entire area thereof, and adapted to receive and retain the drip from the lower end of the head.

4. In a valve, a casing terminating at its bottom in a downwardly convergent inwardly conical nozzle, a closing element having a lower sealing portion and an upper portion of lesser diameter than the adjacent portion of the nozzle, a valve stem, means to move said stem in the direction of its axis, means to guide said stem in its movement, a connection between said element and stem permitting free oscillation of the element on the stem, and means on said upper portion to engage said conical nozzle to guide said element into sealing position.

5. In a valve, a casing terminating at its bottom in a downwardly convergent inwardly conical nozzle, a closing element having a narrow sealing portion adapted to seal said nozzle at the discharge end, and an upper portion spaced from the nozzle wall to permit a free flow of liquid toward said discharge end, a valve stem, means to move said valve stem in the direction of its axis, means to guide said valve stem in its movement, a connection between said element and stem permittitng free oscillation of the element on the stem, and means on said upper portion to engage said conical nozzle to guide said element into sealing position.

6. In a dispensing faucet, a depending tubular casing having a circular discharge port at its lower end, the walls of which terminate at a uniform level, a valve movable in said casing to close said port and having a circularly formed head at its lower end adapted and arranged to fit said port and to terminate at the level of the lower end of said casing walls when the valve is in its fully closed position, said head having a circular concave recess opening into its lower end, the bottom thereof forming a continuous surface which extends from the lower end of the side surfaces of the head to the middle portion thereof, and is adapted to receive and retain the drip from the end of the head by capillary action.

7. In a dispensing faucet, a depending tubular casing having a circular discharge port at its lower end, the walls of which terminate at a uniform level, a valve downwardly movable to fit in said casing to close said port and having a head at its lower end adapted and arranged to fit said port and to terminate at the level of the lower end of the casing, when the valve is seated, said head having a concave recess which is of spherical form opening into its lower end throughout the entire area thereof, and adapted to restrict and retain the drip from the lower end of the head.

8. In a dispensing faucet, a depending tubular casing having a circular discharge port at its lower end, the external and internal walls of the casing tapering at different angles to intersect and to form a terminal edge at a uniform level, a valve downwardly movable to fit in said casing and having a head at its lower end adapted to fit said port and to terminate at the level of said edge of the casing when the valve is seated, said head having a circular concave drop-retaining recess in its lower end, the bottom of which meets its side in an edge and extends continuously to the middle thereof.

In testimony whereof, I affix my signature.

HERBERT L. SHALLCROSS.